US012576451B2

(12) United States Patent
Maurer et al.

(10) Patent No.: US 12,576,451 B2
(45) Date of Patent: Mar. 17, 2026

(54) CHUCK

(71) Applicant: SMW-Autoblok Spannsysteme GmbH, Meckenbeuren (DE)

(72) Inventors: Eckhard Maurer, Oberteuringen (DE); Patrick Dannecker, Hardthausen (DE)

(73) Assignee: SMW-Autoblok Spannsysteme GmbH (DE)

( * ) Notice: Subject to any disclaimer, the term of this patent is extended or adjusted under 35 U.S.C. 154(b) by 650 days.

(21) Appl. No.: 17/942,762

(22) Filed: Sep. 12, 2022

(65) Prior Publication Data

US 2023/0084822 A1 Mar. 16, 2023

(30) Foreign Application Priority Data

Sep. 13, 2021 (EP) ..................................... 21196241

(51) Int. Cl.
B23B 31/28 (2006.01)

(52) U.S. Cl.
CPC ..................................... B23B 31/28 (2013.01)

(58) Field of Classification Search
None
See application file for complete search history.

(56) References Cited

U.S. PATENT DOCUMENTS

| | | | | |
|---|---|---|---|---|
| 4,815,780 A * | 3/1989 | Obrist | .................. | B23Q 1/0063 |
| | | | | 294/86.4 |
| 2009/0314113 A1* | 12/2009 | Wang | ...................... | B25J 15/04 |
| | | | | 74/148 |
| 2017/0217028 A1* | 8/2017 | Stockschlaeder | ...... | B25J 9/0096 |

FOREIGN PATENT DOCUMENTS

| | | |
|---|---|---|
| DE | 10 2012 014 617 | 5/2013 |
| EP | 3 391 991 | 10/2018 |

(Continued)

*Primary Examiner* — Ryan A Jarrett
(74) *Attorney, Agent, or Firm* — Pandiscio & Pandiscio

(57) ABSTRACT

In the case of a clamping device (1) for holding a workpiece (3) to be machined by a machine tool (2), consisting of a housing (4), at least one clamping jaw (7) mounted in the housing (4) so that it is axially movable and a counter-stop (10) formed by the housing (4), between which the workpiece (3) is clamped or at least two clamping jaws (7, 8, 9) mounted in the housing (4) so they are axially movable, between which the workpiece (3) is clamped, and an electrically operated drive device (11), by means of which the movable clamping jaws (7, 8, 9) are movably controlled, and by means of which a holding force, transmitted by the clamping jaws (7, 8, 9) to the workpiece (3) or by a clamping bolt (3') coupled with the workpiece (3), is generated during the clamping process, both an automated insertion as well as a clamping device (1) are supposed to be further developed, by means of which an automated position check of the inserted workpiece (3) can be carried out, and by means of which, when the test result is available, either the beginning of the machining process is automatically initiated or a check of the position of the workpiece (3) in the clamping device (1) is conducted. This is achieved in that an electromechanical and/or inductive interface (12, 13) is provided on the housing (4), which interface is connected inductively to the drive device (11) and/or an analysis device (11') and/or by means of electric lines (16), that the interface (12, 13) for an external robotic arm (14) is accessible and communicates with said robotic arm in such a way, that electric data signals and/or electric energy between the interface (12, 13) of the housing (4) and an electromechanical and/or inductive interface (12', 13') of the robotic arm (14) can be transmitted alternately and bidirectionally.

6 Claims, 6 Drawing Sheets

(56)         References Cited

FOREIGN PATENT DOCUMENTS

EP          3 653 333          1/2021
JP              08257963  A   * 10/1996

* cited by examiner

CHUCK

REFERENCE TO PENDING PRIOR PATENT APPLICATION

This patent application claims benefit of European Patent Application No. 21 196 241.0, filed Sep. 13, 2021, which patent application is hereby incorporated herein by reference.

FIELD OF THE INVENTION

The invention relates to a clamping device for holding a workpiece to be machined by a machine tool according to the preamble of Patent Claim 1.

BACKGROUND OF THE INVENTION

As is generally known, these types of clamping devices can be used as clamping chucks, as a vice or as zero point clamping systems. In the case of all these types of clamping devices, the centered arrangement of the workpiece with respect to a reference plane or reference axis, for example the axis of symmetry of the housing, is of technically decisive importance, because the workpiece should be able to be machined by a machine tool with a low error tolerance as much as possible. To do so, it is necessary to know the exact position of the workpiece with respect to a reference plane or reference axis and to achieve this clamping position with reproducible accuracy when exchanging a structurally identical workpiece.

It is currently disadvantageous that the workpieces to be machined must be replaced manually by operating personnel. Consequently, every workpiece to be machined must be clamped in and be removed from the clamping device after the machining process in order to be able to insert another workpiece into the clamping device.

In addition, it has turned out to be disadvantageous in the case of known clamping devices that the position of the workpiece during insertion and/or during the machining process changes based on the then prevailing centrifugal forces, for example of the clamping chuck or of the rotation of a palette or of the workpiece tool table of a machine tool. When inserting the workpiece, particles in the form of chips or other impurities may be present between the workpiece and the clamping jaw or the workpiece and a contact surface allocated to the housing, on which the workpiece must be positioned in a planar manner, and such particles cause changes in position to then occur. As a result, before the beginning of the machining process by the machine tool, a check must first be made to see whether the workpiece is correctly inserted in the clamping device. But because the workpiece is inserted manually and the known clamping devices frequently use hydraulic or mechanical drive devices to move the clamping jaws, a position check of the inserted workpiece is associated with a considerable expenditure of time and the operating personnel require corresponding technical knowledge in order to be able to perform this check of the inserted workpiece.

SUMMARY OF THE INVENTION

Therefore, the object of the invention is to further develop both an automated insertion as well as a clamping device of the type cited at the outset, by means of which an automated position check of the inserted workpiece can be carried out and that, when the test result is available, either the beginning of the machining process is automatically initiated or a check of the position of the workpiece in the clamping device is conducted.

This object is attained according to the invention by the features of the characterizing part of Patent Claim 1.

Additional advantageous further developments of the invention are disclosed in the dependent claims.

Due to the fact that an electromechanical and/or inductive interface is provided on the housing, which interface is connected inductively to the drive device and/or an analysis device and/or by means of electric lines, that the interface for an external robotic arm is accessible and communicates with said robotic arm in such a way, that electric data signals and/or electric energy between the interface and the robotic arm can be transmitted alternately and bidirectionally, an automated query related to the clamping situation of the workpiece in the clamping device begins before the machining process by the machine tool.

The robotic arm used for the automated check of the clamping position of the workpiece in the clamping device can be advantageously mounted on a chassis, so that the robotic arm is freely movable in an assembly hall and thus can start up multiple machine tools and query the clamping parameters thereof. It is readily conceivable to fasten the robotic arm to a ceiling, a crane or the like and to be able to move said robotic arm in a specific surface area in which the appropriate machine tools are set up.

Using a control device allocated to the chassis of the robotic arm makes it thereby possible to advantageously execute both the movement of the robotic arm as well as the query of the clamping position of the workpiece on the clamping device. Once the control device has queried the clamping position and in doing so established that the workpiece is correctly clamped in, the control device issues a corresponding electric command signal, by means of which the machine tool is activated. Consequently, after inserting the workpiece into the respective clamping device, the clamping position of the workpiece can thereby be automatically queried, controlled, and, if appropriate measurement results are present, the machining process can be activated.

In order to produce the electric data signal transmission between the clamping device and the robotic arm, pins or plug-in slots are provided on the housing for mechanical and electrical coupling. An inductive interface in the form of a supporting surface can be present as an option. Mechanical or inductive interfaces corresponding appropriately to the free end of the robotic arm are provided, so that the robotic arm is connected either mechanically and electrically to the mechanical interface of the housing during the verification timeframe or a contactless data transmission occurs between the robotic arm and the inductive interface of the housing. Due to the mechanical and inductive interfaces that are used, both electric data signals as well as electric energy can thereby be transmitted alternately, i.e., bidirectionally between the clamping device and the robotic arm. The robotic arm is communicatively connected to a control center via appropriate antennae, WLAN connections or electric lines, so that the measurement data analyzed or received by the robotic arm can be transmitted immediately to the control room. Consequently, a corresponding machine hall in which several such machine tools are present can be monitored and operated centrally from a control room.

The drawings depict an exemplary embodiment of a clamping device in various structural designs, which are explained in greater detail in the following. In detail, the following shows:

DETAILED DESCRIPTION OF THE PREFERRED EMBODIMENTS

Figure 1A:
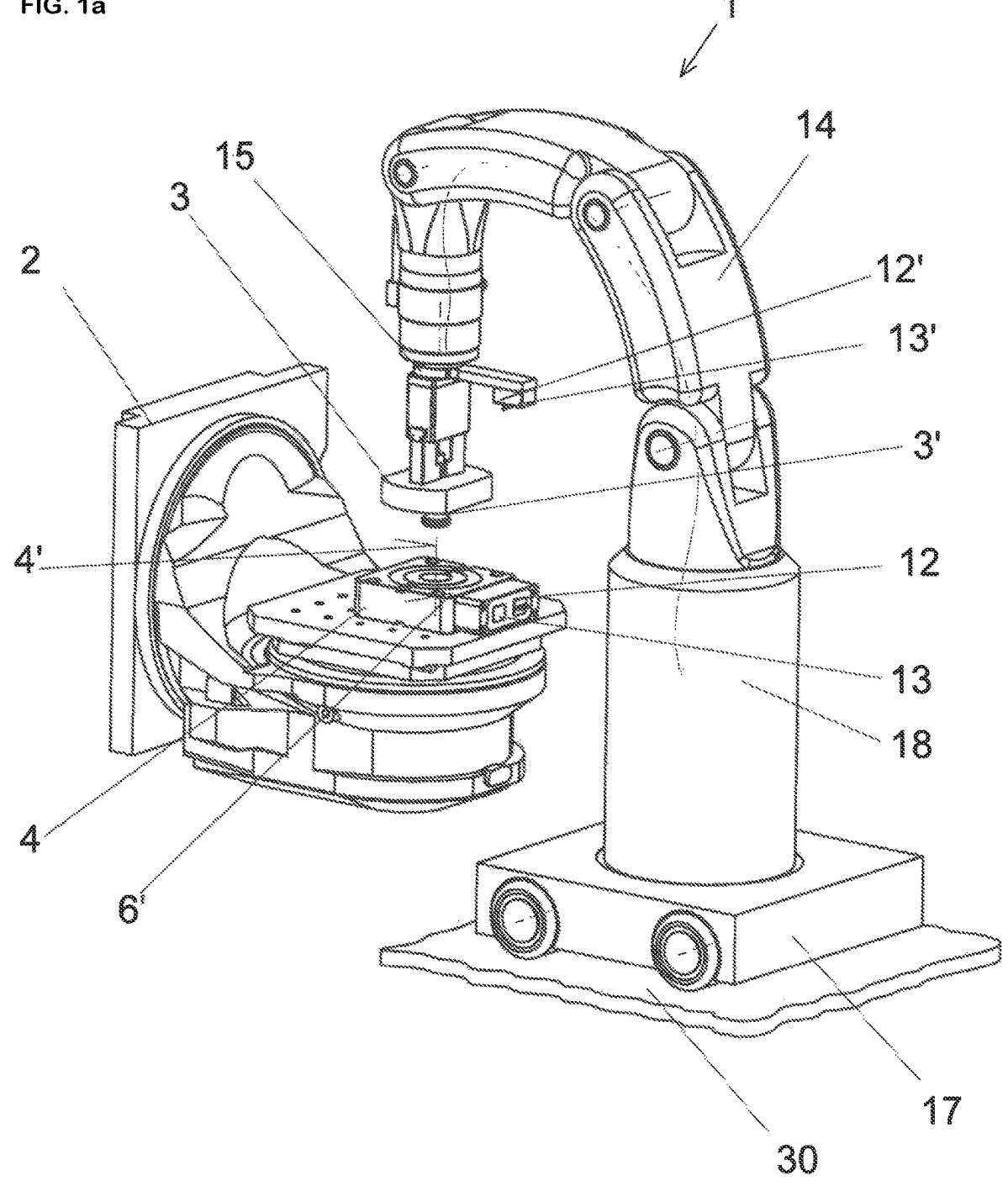
FIG. 1a A perspective view of a clamping device mounted on a tool table, by means of which a workpiece is inserted between three clamping jaws and is clamped by said clamping jaws during the machining process of a machine tool, and a robotic arm, which is mounted on a chassis and automatically places the workpiece on the clamping device, FIG. 1b The machine tool, the clamping device and the robotic arm according to FIG. 1a, wherein the robotic arm and the clamping device communicate with each other by means of electromechanical and inductive interfaces, FIG. 2a The clamping devices[1] according to FIG. 1a, wherein the robotic arm is rotated by 90°, in order to align the interfaces with each other, FIG. 2b An enlarged depiction of the clamping device according to FIG. 2a from another side, FIG. 3 An enlarged depiction of the clamping device according to FIG. 1a and with a cutout to clarify the construction and function of a zero point clamping system, FIG. 4 The clamping device according to FIG. 1a, in the form of a vice having two clamping jaws that can be advanced toward each other and the electromechanical and inductive interfaces that are freely accessible from the outside as well as the robotic arm, which is arranged adjacent to the interface of the housing, and FIG. 5A palette or a tool table or machine tool, on which the clamping device according FIG. 1a can be mounted in the form of a clamping chuck.

FIG. 1a shows a loading process of a workpiece 3 to be machined by a machine tool 2 on a clamping device 1 by means of a robotic arm 14. The robotic arm 14 holds the workpiece 3 and places it on the opened clamping device 1. The clamping device 1 is designed in this case as a so-called zero point clamping system. This means that every structurally identical workpiece 3 from a production run can be positioned with reproducible accuracy at exactly the predetermined position of the clamping device 1, in order to ensure that the machining steps to be carried out by the machine tool 2 can be performed without reprogramming during a tool series.

The clamping device 1 in this depicted exemplary embodiment consists of a housing 4, in the interior of which three clamping jaws 7, 8, 9 are arranged. In the case of zero point clamping systems, these types of clamping jaws are frequently also designated as clamping slides. The function and the structural design of a zero point clamping system occurs in such a way that the workpiece 3 or a clamping bolt connected to the workpiece 3 is inserted into a receptacle opening integrated into the housing 4. An electrically operated drive device 11 is provided in the housing 4, by means of which the clamping jaws 7, 8, 9 are moved synchronously. The clamping jaws 7, 8, 9 are thereby inserted in an axially movable manner into guide grooves (not shown); the respective guide grooves run radially on a reference axis 4', which corresponds to the axis of symmetry of the receptacle opening of the housing 4.

The robotic arm 14 has a free end 15, on which firstly a gripping device for holding the workpiece 3 is arranged and secondly an electromechanical and inductive interface 12' or 13'. Provided on the outer side of the housing 4 is an electromechanical interface 12 and an inductive interface 13, which communicate with the respective interface 12' or 13' of the robotic arm 14 to transmit electric data signals and electric energies.

The robotic arm 14 is mounted on a chassis 17, to which a control device 18 is allocated. By means of the control device 18, the chassis 17 is supposed to be automatically movable on an substrate and, at the same time, the movement sequences required for the robotic arm 14 are supposed to be executable by the control device 18 as a function of the position of the chassis 17 or the robotic arm 14.

Figure 1B:
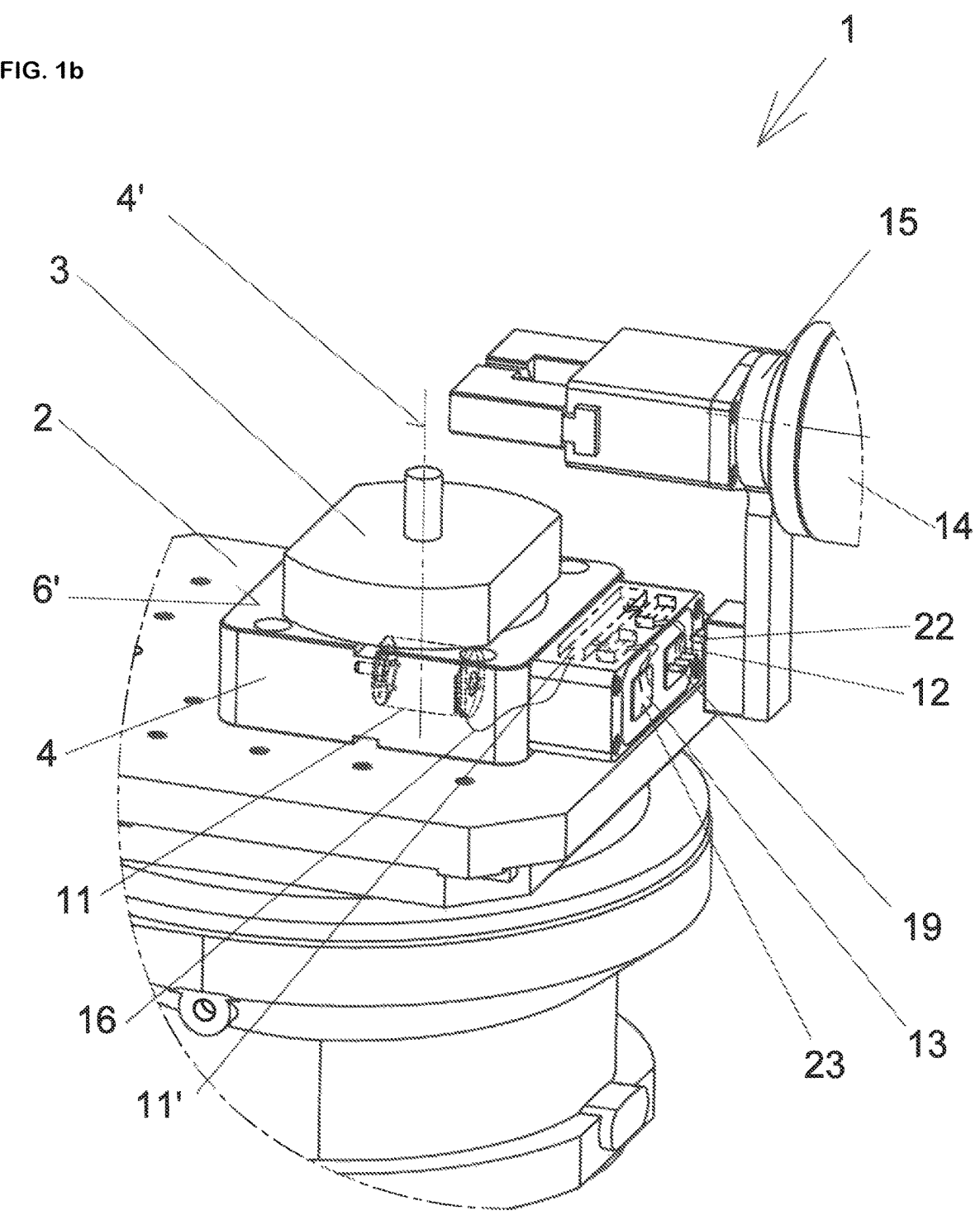

FIG. 1b shows that the robotic arm 14 has placed the workpiece 3 on a supporting surface 6', which is formed by the housing 4. As a result, the workpiece 3 is resting on the supporting surface 6' predetermined by the housing 4. In the interior of the housing 4, the electric drive device 11 has advanced the three clamping jaws 7, 8 or 9. As a result of constructive measures, a pull-in force develops during the advancement of the clamping jaws 7, 8, 9, whereby the workpiece 3 is first pressed on the supporting surface 6', and simultaneously a radial holding force, by means of which the workpiece 3 is tensioned in a specific position with the housing 4.

When the workpiece 3 is accordingly positioned on the supporting surface 6' and the clamping jaws 7, 8, 9 are advanced, the machining process on the machine tool 2 can theoretically be started. But since the insertion of the workpiece 3 was carried out fully automatically by the robotic arm 14, the position of the workpiece 3 in relation to the reference surface 6' must be checked. An electric analysis device 11' is provided for this purpose in the housing 4, and said device is coupled inductively and/or via electric lines with the electric drive device. It is namely readily possible to measure the rotational speeds and the associated movement sequences of the electric drive device 11 and thereby calculate the travel path of the respective clamping jaw 7, 8, 9.

In addition, several borehores 31 can be integrated in the supporting surface 6', in which boreholes a proximity sensor 32 is respectively inserted. The proximity sensors 32 are operated inductively and measure the distance between said proximity sensors and the lower side of the workpiece 3 as soon as it is positioned. If one of the measurement results, i.e., the travel path of the respective clamping jaws 7, 8, 9 and/or the measurement result of the proximity sensor 32, should deviate from a predetermined tolerance range, the electric analysis device 11' will detect this.

Figures 2A, 2B:
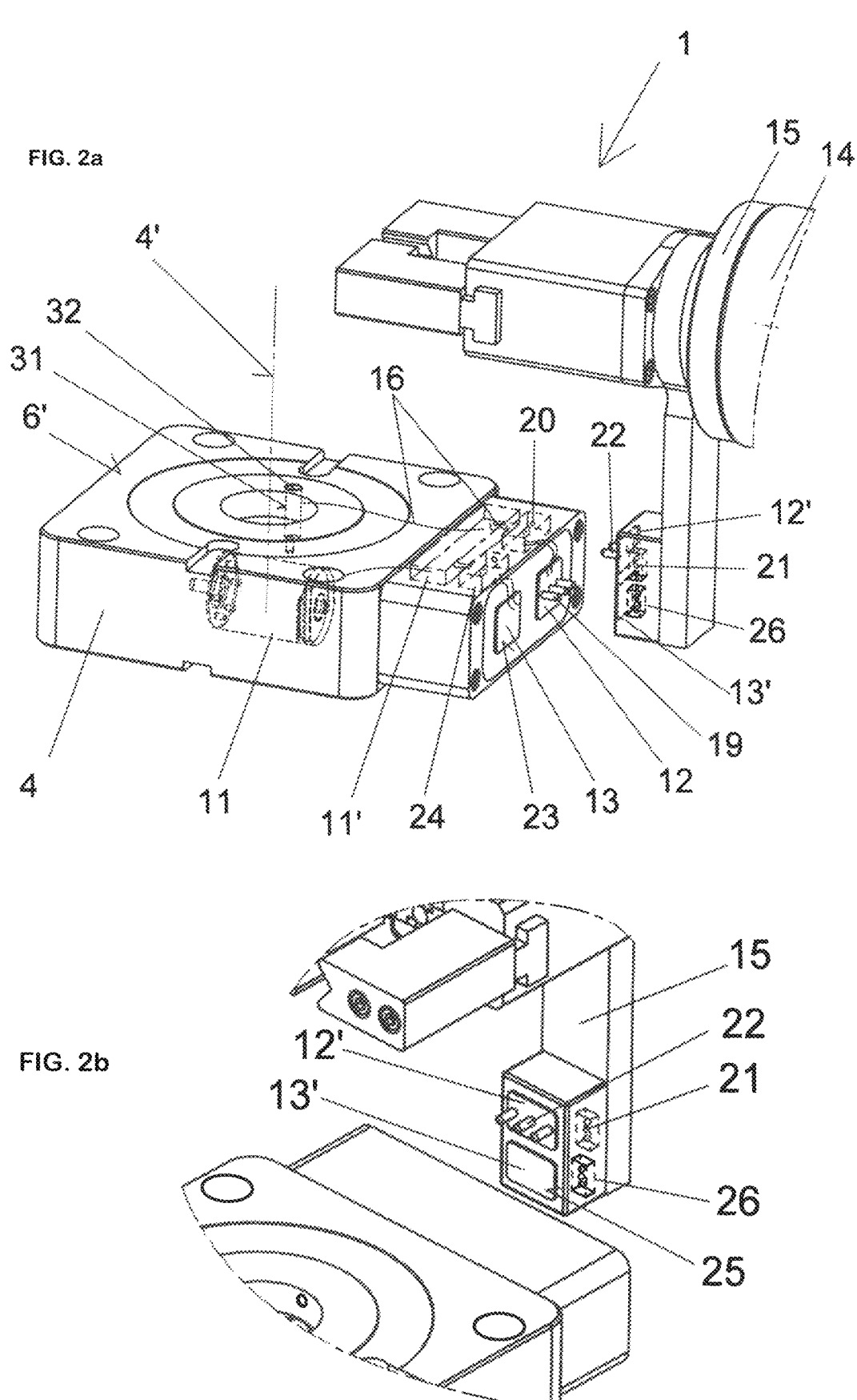

As soon as the robotic arm 14 places the workpiece 3 on the supporting surface 6', the robotic arm 14 rotates the free end 15 in such a way that the electromechanical and inductive interfaces 12', 13' provided on the free end 15 of the robotic arm 14 are oriented with the electromechanical and inductive interfaces 12 and 13 of the housing 4 so they are aligned with each other. According to FIGS. 2a and 2b, which depict this position, the electromechanical interfaces 12 or 12' either have pins 19 and plug-in slots 21 or conversely plug-in slots 20 and pins 22, which are coupled mechanically and electrically with each other. Consequently, an electromechanical or inductive data signal or energy transmission occurs between the robotic arm 14 and the electric components provided in the interior of the housing 4. Thus electric energy in particular can be transmitted from the robotic arm 14 to the electric drive device 11 or an accumulator that is upstream therefrom, and the electric analysis device 11' can transfer corresponding measurement signals from the proximity sensors 31 to the robotic arm 14 and the control device 18 installed therein. The measurement signals that are generated in such a manner are analyzed by the control device 18 and compared with stored data in a preprogrammed query cycle. If the measurement results are within a predetermined tolerance range, the control device 18 activates the machine tool 2 via the interfaces 12, 12' or 13, 13' or generates an error signal, in order to check the position of the workpiece 3 manually or automatically. Once the control device 18 has conveyed the activation of the machine tool 2, the robotic arm 14 removes itself from the housing 4, so that the machining process by the machine tool 2 is started.

Figure 3:
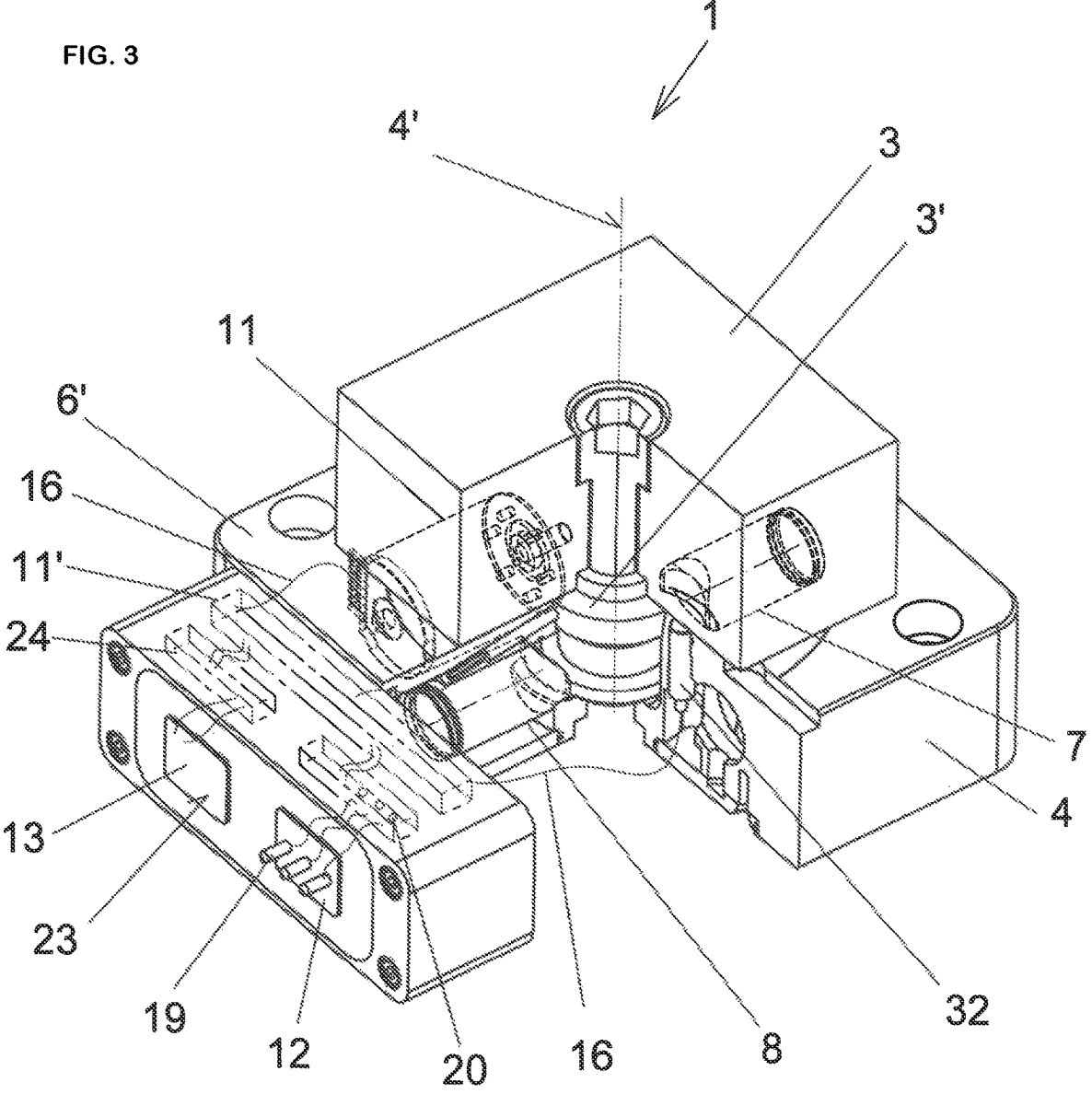

FIG. 3 shows the constructive and functional structure of the zero point clamping system designed as a clamping device 1. In this case, it can also be seen that the inductive interface 13 has been provided with one or more coils functioning as transmitting/receiving devices 24. The interface 13 in this case is embodied as a push button 25, to which a push button 25' can be contactlessly arranged in an aligned manner on the free end 15 of the robotic arm 14. As a result, the inductive signal and energy transmission ensues in a contactless manner; whereas the pins 19 and plug-in slots 21 or plug-in slots 20 and pins 22, which are arranged in pairs to each other, need a mechanical and electrical coupling.

Figure 4:
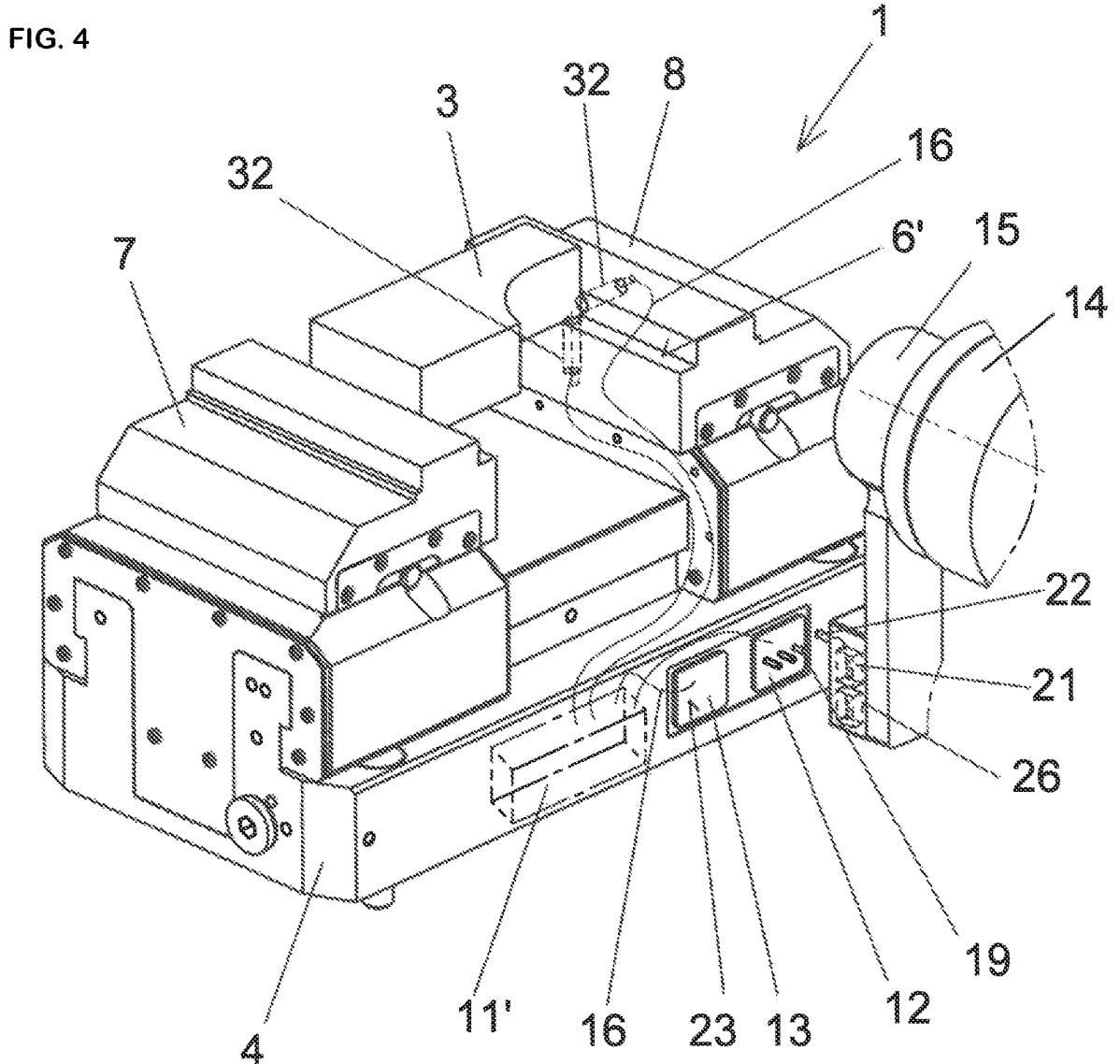

FIG. 4 shows a vice as a clamping device 1, which has two clamping jaws 7 and 8 that can be advanced toward each other, between which the respective workpiece 3 is clamped. Arranged on one of the free outer sides of the housing 4 are the electromechanical and inductive interfaces 12 or 13, which run in alignment with the electromechanical and inductive interfaces 12' and 13' that are present on the robotic arm 14 for the transmission of communication. Consequently, every robotic arm 14 can approach any desired clamping devices 1 in order to correspondingly communicate with them. All that is required is that the arrangement of the interfaces 12 and 13 conforms spatially to the arrangement of the interfaces 12' and 13' and is thereby transferred either into a mechanical and electrical or into an inductive coupling state.

Figure 5:
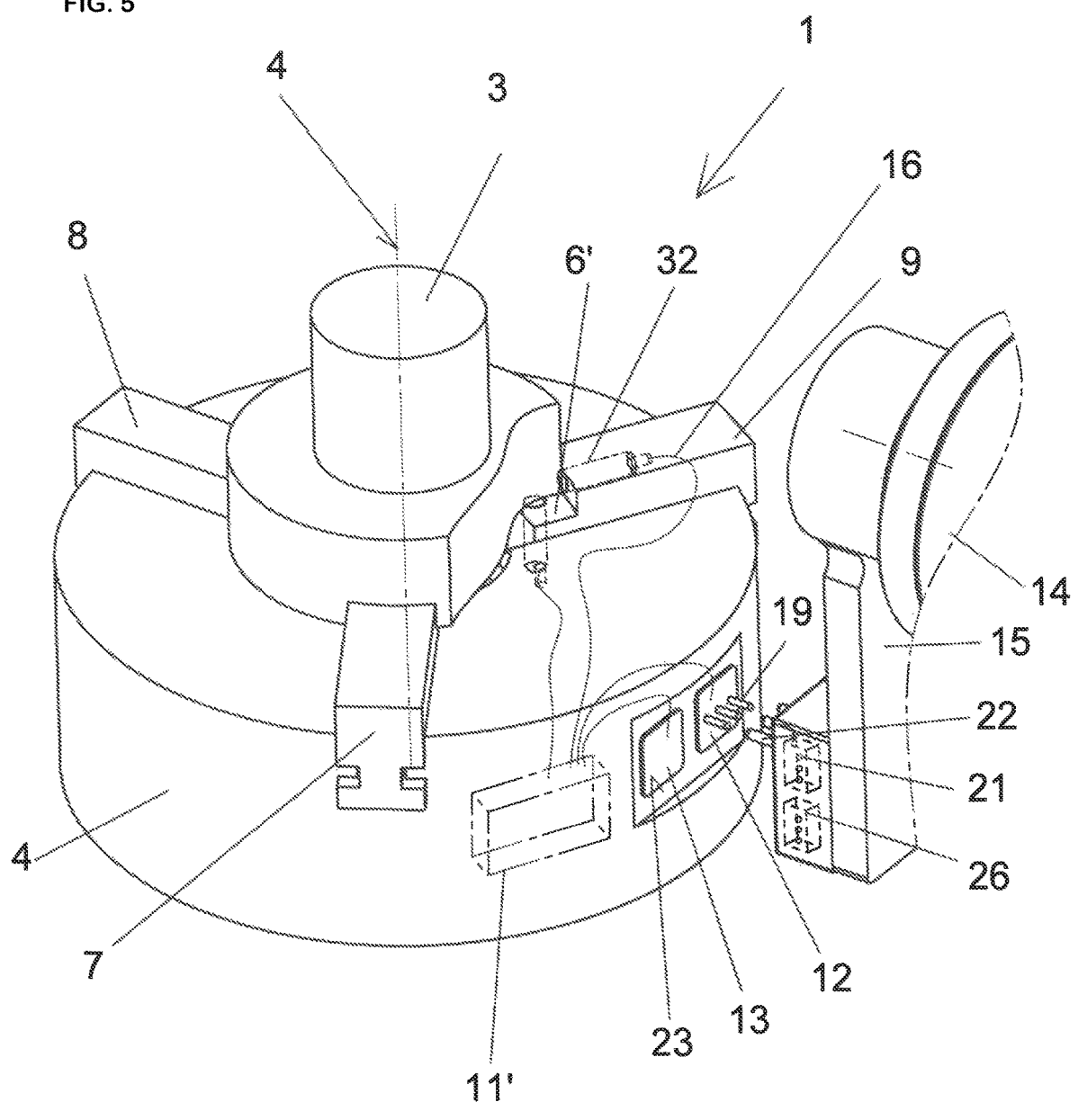

The same applies to the clamping device 1 depicted in FIG. 5, which is designed here as a clamping chuck with three clamping jaws 7, 8 and 9, between which the respective workpiece 3 is inserted and clamped. Often these types of clamping devices 1 that are used as clamping chucks rotate during the machining process, so that an electromechanical or inductive coupling between the interfaces 12, 13 or 12' and 13' of the robotic arm 14 can take place only when the clamping device 1 is in an idle state.

The transmission of electric data signals and the electric energy can take place between the drive device 11, the analysis device 11' and the proximity sensor 32 both inductively as well as by means of electric lines 16.

List of Reference Numbers

1 ≙ Clamping device (zero point
clamping system vice or
clamping chuck)
2 ≙ Machine tool
3 ≙ Workpiece
3' ≙ Clamping bolt for 3
4 ≙ Housing
4' ≙ Reference axis/axis of symmetry
6' ≙ Supporting surface
7, 8, 9 ≙ Clamping jaw
10 ≙ Counter-stop for vice
11 ≙ Drive device, electrical
11' ≙ Electric analysis device
12 ≙ Electromechanical interface on 4

-continued

List of Reference Numbers

12' ≙ Electromechanical interface of 14
13 ≙ Inductive interface on 4
13' ≙ Inductive interface of 14
14 ≙ Robotic arm
15 ≙ Free end of 14
16 ≙ Electric lines in 4
17 ≙ Chassis of 14
18 ≙ Control device
19 ≙ Pins of 12
20 ≙ Plug-in slots of 12
21 ≙ Plug-in slots of 14
22 ≙ Pins of 14
23 ≙ Push button of 13
24 ≙ Transmitting/receiving device of 4
25 ≙ Push button of 14
26 ≙ Transmitting/receiving device of 14
27≙
28≙
29≙
30 ≙ Substrate
31 ≙ Borehole
32 ≙ Proximity sensor

What is claimed is:

1. A clamping apparatus for holding a workpiece to be machined by a machine tool, the clamping apparatus comprising:

a housing, a support surface formed by the housing, at least two clamping jaws mounted in the housing so as to be axially movable, between which at least two clamping jaws the workpiece is clamped, and a drive device, by means of which the clamping jaws can be moved in a controlled manner and by means of which a holding force transmitted from the clamping jaws to the workpiece, or to a clamping bolt coupled to the workpiece, is generated, an electromechanical and/or inductive interface which is provided on the housing and is electrically connected to the drive device and an evaluation device, and a robot arm which communicates with the interface such that electrical data signals and/or electrical energy can be transmitted alternately and bidirectionally between the interface of the housing and a robot arm electromechanical and/or inductive interface provided on a free end of the robot arm, characterized in that the drive device is electrically operated and, as soon as the robot arm has placed the workpiece on the support surface, a free end of the robot arm is rotatable such that the robot arm interface is aligned with, and electrically connected to, the electromechanical and inductive interface provided on the housing.

2. The clamping apparatus according to claim 1, characterized in that the evaluation device is electrically connected to at least one proximity sensor, the position of the workpiece is measured by the at least one proximity sensor in relation to a reference axis of the housing and/or in relation to a support surface associated with the housing, and the measurement result determined by the at least one proximity sensor is transmitted to the evaluation device in the form of electrical data signals.

3. The clamping apparatus according to claim 1, characterized in that the robotic arm is mounted on a chassis, the chassis is associated with a control device, by means of which the chassis and/or the movements of the robotic arm are moved automatically, and the control device runs a program for monitoring clamping of the workpiece on the clamping apparatus.

4. The clamping apparatus according to claim 3, characterized in that at least one of a rotational speed of the drive device and a travel path of the clamping jaws is monitored by the control device, whereby to generate measurement results, by means of which clamping of the workpiece is evaluated and used by the control device to release the machine tool.

5. The clamping apparatus according to claim 1, characterized in that the interface comprises one or more pins or slots, and corresponding slots or pins are provided at the free ends of the robot arm, are mechanically and electrically coupled in pairs.

6. The clamping apparatus according to claim 1, characterized in that the interface comprises an interface button, the interface button is assigned to an inductively operated transmitting and/or receiving device, and the robotic arm comprises a robotic arm button to which a robotic arm transmitting and/or receiving device is assigned for communication with a transmitter and/or receiving device of the interface of the clamping device.

\* \* \* \* \*